United States Patent Office 3,072,521
Patented Jan. 8, 1963

3,072,521
NON-AQUEOUS DEINKING PROCESS
Gilbert J. Samuelson, Webster Groves, and Kenneth J. Lissant, St. Louis, Mo., assignors to Petrolite Corporation, Wilmington, Del., a corporation of Delaware
No Drawing. Filed July 27, 1959, Ser. No. 829,498
19 Claims. (Cl. 162—5)

This invention relates to an essentially non-aqueous process of deinking cellulosic materials, such as paper products, which comprises treating imprinted cellulosic materials such as paper products with a surfactant-containing organic solvent.

Paper manufacture does not damage or alter the character of the essential fiber from which the paper is originally made; hence, such fiber may be recovered from used paper and reused, time after time, in the manufacture of fresh paper stock. The limitations in respect of practical recovery of fiber from used paper are to be found in the difficulty and consequent expense of thoroughly deinking printed paper stock to upgrade it to the color and quality of the original paper stock.

Many processes have been used for deinking cellulosic materials, such as waste paper to make the cellulosic content thereof useful in a pulp for reuse in forming paper or other cellulosic products. These processes, however, are expensive, laborious, time-consuming, complicated, and present pollution problems in disposing of the wastes thereof.

In general, in preparing used paper for deinking and recovery of fiber, the stock to be salvaged is first thoroughly cleansed of superficial dirt and macerated by means of any suitable system or apparatus. Then the maceratum is boiled, subjected to the cooking and defibering in a suitable aqueous alkali to soften the paper fibers, loosen and disintegrate at least part of the ink and other matter adhering to the fibers, and thoroughly agitated, either while in the alkaline solution or subsequently, to disintegrate and defiber the stock as thoroughly as possible. Thereafter, the pulp is riffled and screened and subsequently dewatered, preferably through suitable rolls, filters, or the like, to remove a considerable portion of the loosened ink. It is then washed and dewatered for removal of additional quantities of the loosened ink as many times as may be practical and expedient.

Thus, all commercially successful processes for deinking waste paper involve the following steps:

(1) Dusting and maceration
(2) Alkali cooking and defibering
(3) Riffling and screening
(4) Washing In general, the sorted, dusted and macerated paper is cooked with an aqueous deinking agent at a temperature of from 140° F. to its boiling point for 2.5–48 hours at concentrations of 4–25% by weight of paper in the alkali solution. Heat consumption will vary inversely with the concentration and viscosity of the stock. Defibering is generally accomplished during the cooking operation.

In general, the deinking agent employed contains an aqueous alkali solution which may in addition contain one or more of the following: a detergent, for example sodium soaps of fatty acids or abietic acid, sulfonated oil, etc.; a dispersing agent to prevent agglomeration of the pigment after release and to emulsify any unsaponifiable material; a softening agent such as kerosine or mineral oil, etc., to soften the vehicle of the inks; an agent such as clay, a silicate, etc., for selective adsorption after release from the fiber to prevent redeposition on the fiber; a basic exchange chemical to prevent formation of calcium soaps, etc.

The cooked and defibered pulp is then diluted to less than 1% concentration and riffled and screened to remove oversized objects and undefibered pieces of paper. This material is then washed with voluminous amounts of water, an average of 20,000 gallons of water per ton of pulp, to separate the fiber from other substances by washing or screening or by a flotation process. The disposal of large amounts of water used in the process poses a stream pollution problem which must be remedied in most areas of the country.

The problem of deinking has been further complicated by certain recent changes in the paper industry which have increased the difficulty of deinking, among which changes are the following:

(1) The increased use of groundwood containing small slivers of wood rubbed from pulp wood present jagged sawtooth ends which afford excellent crevices for trapping the carbon particles of the printer's ink, thus making it increasingly difficult to produce a reuseable pulp of high quality of whiteness.

(2) Many of the improved new inks currently in use are non-saponifiable with caustic, and generally require more drastic cooking conditions during deinking, thus tending to further degrade the cellulosic fiber.

(3) Certain paper coatings such as casein and soybean proteins hardened with formaldehyde require for their removal higher temperatures which also degrade the fiber.

(4) The increased filler content of paper, now approaching an average of 25%, results in increased shrinkage during deinking which increases the cost of deinked stock.

Among the disadvantages of prior processes are the following:

(1) Long cooking periods at elevated temperatures require large expenditures of energy with increased expense.

(2) High temperatures and strong chemicals employed in these processes tend to deleteriously affect the fibers so that they are not always of the same quality as those from fresh paper pulp.

(3) The use of large amounts of water poses a stream pollution problem which requires expensive pollution control systems.

A statement of the deinking problems and proposed solutions thereof can be found, for example, in the following patents:

| | |
|---|---|
| 2,673,798 | 2,112,562 |
| 2,607,678 | 2,077,059 |
| 2,580,161 | 2,005,742 |
| 2,219,781 | 1,993,362, etc. |

We have now discovered an essentially non-aqueous process of deinking cellulosic materials, such as imprinted paper products, which comprises treating ink-containing celluolsic materials with a surfactant-containing organic solvent. Since this process can be carried out at room temperature in a short period of time, no expediture of heat energy nor long holding periods are required. Since no strong chemicals, high temperatures no extended reaction periods are required, little, if any, degradation of the pulp occurs, with obvious advantages. Since no water washes are required, or if they are employed, they are carried out at room temperatures, little, if any, stream pollution results from the aqueous effluent. These and other advantages will become evident as the process is described.

The facility with which the ink is removed from the paper by the present invention is indeed unexpected in the art since organic solvents themselves, without the surfactant, effect little, if any, separation of the ink—in fact, they tend to further darken the paper. Furthermore, totally or substantially totally non-aqueous systems of any kind have never been successfully employed. In addition, the present effect of a surfactant in a non-aqueous system is unexpected since one generally employs surfactants to affect the properties of a dual aqueous-organic system and not those in which the system is essentially organic.

THE SOLVENT

The non-aqueous solvent employed in the present process may vary widely although, in general, the more non-polar organic solvents are most advantageously employed. This does not preclude the use of polar type solvents, particularly where polarity is masked by an organic group, or groups having a relatively large hydrocarbon group or groups. A convenient test of suitable polarity of the solvent is its solubility in water. Those solvents which are relatively insoluble, for example, will dissolve less than about five percent by volume, but preferably less than about one percent by volume, of water are most advantageously employed.

Based on commercial considerations, the solvent should be inexpensive and relatively low boiling, for example, boiling below about 200° C., but preferably below about 110° C. However, this does not preclude the use of high boiling solvents since various methods can be used for their recovery, such as by reduced pressure, steam distillation, etc.

Examples of suitable solvents include straight and branched chain alkanes, for example hexanes, heptanes, octanes, nonanes, decanes, undecanes, etc.; cycloalkanes, for example cyclo-hexane, terpenes, etc., the reduced aromatic compounds such as those of benzene and naphthalene such as di-, tetra-, and hexahydrobenzene, tetra-, and decahydronaphthalene; aromatic compounds, for example benzene, toluene, ethylbenzene, xylene, etc. and mixtures thereof that occur naturally or result from industrial processes or which are artificially mixed, for example, petroleum ethers, gasoline, kerosine, naphtha solvents, white spirits, etc. In addition, other water insoluble or substantially water insoluble organic solvents can be employed, for example halocarbons, alcohols, ethers, ketones solvents having more than one of these groups, for example keto-alcohols, etc. Although the solvent employed is a non-aqueous solvent, the presence of small amounts of water which do not interfere with the essentially organic nature of the solvent is within the scope of this invention.

THE SURFACTANTS

A wide variety of surfactants can be employed in this invention. The chemical nature and structure of the surfactant are not important except as they relate to their function in the present process.

In general, all classes of surfactants can be employed in this invention including anionic, cationic, non-ionic and ampholytic surfactants, provided they are sufficiently soluble in the organic solvent to be effective.

As is evident, the subclasses and species under the above classes are legion. To enumerate all surfactants that can be employed in this invention would be unnecessary and would render the specification too voluminous. Therefore, we shall merely present the general types of surfactants which can be employed in this invention and more fully describe certain preferred types of surfactants which are illustrated by specific examples.

An excellent discussion of surfactants can be found in the texts, "Surface Active Agents and Detergents" by Schwartz et al. (vol. I, 1949, vol. II, 1958), Interscience Publishers, New York, which volumes are by reference incorporated into the present application. In vol. I of these textbooks is a classification scheme that is useful in a general representation of useful surfactants.

I. Anionic

A. Carboxylic acids:
  (1) Carboxyl joined directly to the hydrophobic group (subcalssification on basis of the hydrophobic group, e.g., fatty acid soaps, rosin soaps, etc.
  (2) Carboxyl joined through an intermediate linkage.
    (a) Amide group as intermediate link.
    (b) Ester group as intermediate link.
    (c) Sulfonamide group as intermediate link.
    (d) Miscellaneous intermediate links, ether, $-SO_2-$, $-S-$, etc.
B. Sulfuric esters (sulfates):
  (1) Sulfate joined directly to hydrophobic group.
    (a) Hydrophobic group contains no other polar structures (sulfated alcohol and sulfated olefin type).
    (b) Sulfuric esters with hydrophobic groups containing other polar structures (sulfated oil type).
  (2) Sulfate group joined through intermediate linkage.
    (a) Ester linkage (Artic Syntex M. type).
    (b) Amide linkage (Xynomine type).
    (c) Ether linkage (Triton 770 type).
    (d) Miscellaneous linkages (e.g., oxyalkylimidazole sulfates).
C. Alkane sulfonic acids:
  (1) Sulfonic group directly linked.
    (a) Hydrophobic group bears other polar substitutents ("highly sulfated oil" type). Chloro, hydroxy, acetoxy, and olefin sulfonic acids (Nytron type).
    (b) Unsubstituted alkane sulfonic acids (MP 189 type; also cetane sulfo acid type).
    (c) Miscellaneous sulfonic acids of uncertain structure, e.g., oxidation products of sulfurized olefins, sulfonated rosin, etc.
  (2) Sulfonic groups joined through intermediate linkage.
    (a) Ester linkage.
      (1) $RCOO-X-SO_3H$ (Igepon AP type).
      (2) $ROOC-X-SO_3H$ (Aerosol and sulfoacetate type).
    (b) Amide linkage.
      (1) $RCONH-X-SO_3H$ (Igepon T type).
      (2) $RNHOC-X-SO_3H$ (sulfosuccinamide type).
    (c) Ether linkage (Triton 720 type).
    (d) Miscellaneous linkages and two or more linkages.
D. Alkyl aromatic sulfonic acids:
  (1) Hydrophobic group joined directly to sulfonated aromatic nucleus (subclasses on basis of nature of hydrophobic group. Alkyl phenols, terpene, and rosin-aromatic condensates, alkyl aromatic ketones, etc.).
  (2) Hydrophobic group joined to sulfonated aromatic nucleus through as intermediate linkage.
    (a) Ester linkage (sulfophthalates, sulfobenzoates).
    (b) Amide and imide linkages.
      (1) $R-CONH-ArSO_3H$ type.
      (2) Sulfobenzamide type.
    (c) Ether linkage (alkyl phenyl ether type).
    (d) Heterocyclic linkage (Ultravon type, etc.).
    (e) Miscellaneous and two or more links.
E. Miscellaneous anionic hydrophilic groups:
  (1) Phosphates and phosphonic acids.
  (2) Persulfates, thiosulfates, etc.
  (3) Sulfonamides.
  (4) Sulfamic acids, etc.

II. Cationic

A. Amine salts (primary, secondary, and tertiary amines):
  (1) Amino group joined directly to hydrophobic group.
    (a) Aliphatic and aromatic amino groups.
    (b) Amino group is part of a heterocycle (alkaterge type).
  (2) Amino group joined through an intermediate link.
    (a) Esther link.
    (b) Amide link.
    (c) Ether link.
    (d) Miscellaneous links.
B. Quaternary ammonium compounds:
  (1) Nitrogen joined directly to hydrophilic group.
  (2) Nitrogen joined through an intermediate link.
    (a) Ester link.
    (b) Amide link.
    (c) Ether link.
    (d) Miscellaneous links.
C. Other nitrogenous bases:
  (1) Non-quaternary bases (classified as guanidine, thiuronium salts, etc.).
  (2) Quaternary bases.
D. Non-nitrogenous bases:
  (1) Phosphonium compounds.
  (2) Sulfonium compounds, etc.

III. Non-Ionic

A. Ether linkage to solubilizing groups.
B. Ester linkage.
C. Amide linkage.
D. Miscellaneous linkages.
E. Multiple linkages.

IV. Ampholytic

A. Amino and carboxy:
  (1) Non-quaternary.
  (2) Quaternary.
B. Amino and sulfuric ester:
  (1) Non-quaternary.
  (2) Quaternary.
C. Amine and alkane sulfonic acid.
D. Amine and aromatic sulfonic acid.
E. Miscellaneous combinations of basic and acidic groups.

Examples of specific commercial surfactants useful in the present invention include those disclosed in "Emulsions Theory and Practice," by Paul Becker, ACS Monograph No. 135, Rhinhold Publishing Corp., 1957, pp. 337–371, which are hereby incorporated by reference into the present specification.

One class of surfactant advantageously employed includes the non-ionic surfactants. Because it is a preferred class, we will discuss it in detail.

The most typical representatives of this class are the oxyalkylated surfactants or more specifically polyalkylene ethers or polyoxyalkylene surfactants. Oxyalkylated surfactants as a class are well known. The possible subclasses and specific species are legion. The methods employed for the preparation of such oxyalkylated surfactants are also too well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, or higher oxides, epichlorohydrin, etc. However, they may be obtained by other methods such as shown in U.S. Patents 2,588,771 and 2,596,091–3, or by esterification or amidification with an oxyalkylated material, etc. Mixtures of oxides or successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water-soluble surfactant by the addition of polyethoxy chains. Subsequent additions of ethoxy units to the chains tend to increase the water solubility, while subsequent additions of higher alkoxy chains tend to increase the oil solubility. In general, the final solubility and surfactant properties are a result of a balance between the oil-soluble and water-soluble portions of the molecule. Since the present invention relates to non-aqueous systems, the oxyalkylated surfactant employed herein should be organically soluble.

In general, the compounds are oxyalkylated surfactants of the general formula $$Z[(OR)_nOH]_m$$

wherein Z is the oxyalkylatable material, R is the radical derived from the alkylene oxide which can be, for example, ethylene, propylene, butylene, epichlorohydrin and the like, n is a number determined by the moles of alkylene oxide reacted, for example 1 to 2000 or more and m is a whole number determined by the number of reactive oxyalkylatable groups. Where only one group is oxyalkylatable as in the case of a monofunctional phenol or alcohol, R'OH, then $m=1$. Where Z is water, or a glycol, $m=2$. Where Z is glycerol, $m=3$, etc.

In certain cases, it is advantageous to react alkylene oxides with the oxyalkylatable material in a random fashion so as to form a random copolymer on the oxyalkylene chain, i.e. the $[(OR)_nOH]_m$ chain such as

AABAAABBABABBABBA—

In addition, the alkylene oxides can be reacted in an alternate fashion to form block copolymers on the chain, for example BBBAAABBBAAAABBBB— or

—BBBBAAACCCAAAABBBB— where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include terpolymers or higher copolymers polymerized randomly or in a block-wise fashion or in many variations of sequential additions.

Thus, $(OR)_n$ in the above formula can be written $—A_aB_bC_c—$ or any variation thereof, wherein $a$, $b$ and $c$ are 0 or a number provided that at least one of them is greater than 0.

The nature of the oxyalkylatable starting material used in the preparation of the emulsifier is not critical. Any species of such material can be employed. By proper additions of alkylene oxides, this starting material can be rendered suitable as a surfactant in the present process.

TABLE I.—REPRESENTATIVE EXAMPLES OF Z

| No. | Z |
|---|---|
| 1 | $R\overset{O}{\underset{\|}{C}}-O-$ |
| 2 | $R_n-\langle\text{phenyl}\rangle-O-$ |
| 3 | $R-O-$ |
| 4 | $R-S-$ |
| 5 | $R-\overset{O}{\underset{\|}{C}}-\overset{H}{\underset{\|}{N}}-$ |
| 6 | $R-\overset{O}{\underset{\|}{C}}-N\langle$ |
| 7 | $R-\overset{H}{\underset{\|}{N}}-$ |
| 8 | $RN\langle$ |
| 9 | Phenol-aldehyde resins |
| 10 | $-O-$ (Ex: Alkylene oxide block polymers) |
| 11 | 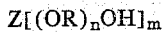 $R-\langle\rangle-X-\langle\rangle-R$;  $X=O-,-S-,-CH_2-,-CR_2-\overset{O}{\underset{O}{S}}-$, etc. |
| 12 | $R-S-CH_2\overset{O}{\underset{\|}{C}}-O-$ |
| 13 | $RPO_4H-$ |
| 14 | $RPO_4\langle$ |
| 15 | $PO_4=$ |
| 16 | $R_n-\langle\rangle-SO_2\overset{H}{N}-$ |
| 17 | $R_n-\langle\rangle-SO_2N=$ |
| 18 | $R\overset{O}{\underset{\|}{C}}-\overset{H}{\underset{\|}{N}}-\langle\rangle-N\langle$ |
| 19 | Polyol-derived (Ex: glycerol, glucose, pentaerithytol) |
| 20 | Anhydrohexitan or anhydrohexide derived |
| 21 | Polycarboxylic derived |
| 22 | $-(CH_2CH-O)_n-$ with $CH_2$–amine side |

THE PROCESS

In general, the process of this invention is carried out by treating used paper, which has preferably been sorted, dusted and macerated, with the surfactant-containing organic solvent. In practice, the waste paper to be treated is preferably subdivided in relatively small pieces as by passing the waste paper through a conventional shredding machine. The exact size of the pieces is not material, it being advisable merely to so subdivide the waste paper as to avoid the presence of a thick bulky mass which might damage the beater in which the waste paper is subsequently treated and to expose the inked paper to intimate contact with the surfactant-containing solvent.

After the paper has been shredded, it is introduced into the surfactant-containing solution in an operating beating engine in sufficient quantity to provide a suspension which the beater can satisfactorily handle. In practice, we employ a suspension of approximately from about one to ten percent by weight, or higher, solid content, but preferably about two to five percent, with an optimum of about 2.5 to 4 percent.

The ratio of surfactant to organic solvent will vary depending on various factors: for example, the particular solvent employed, the particular surfactant employed, etc. However, in practice, we employ a concentration of surfactant in organic solvent of about 2 to 20 volume percent, or higher, for example about 4 to 12 percent with an optimum of about 6 to 10 percent. Of course, it should be realized that the surfactant can be added to the solvent prior to addition to the beater or any time thereafter, provided the combination of surfactant and solvent is placed in intimate contact with the paper.

The temperature of the reaction mass is not critical. Any temperature can be employed which is convenient. In practice, we carry out the treatment at room temperature although there is no reason why higher or lower temperatures cannot be employed, if desired, for example, below room temperature or above the boiling point of the solvent if pressure equipment is employed, in certain instances.

The mass in the beater is circulated around the beater and subjected to the action of the beater wheel until "shiners" have practically disappeared from the mass. The time required for this operation will vary with the particular apparatus employed. Further beating promotes an excess of fine fibers which may not be desirable in preparing paper. Beating time varies with the particular system and apparatus employed, but ordinarily in the laboratory the beating of the mass is continued from about one-half to three minutes, or longer, for example about one to two minutes with an optimum of about one to one and one-half minutes, or until the fiber is completely freed of ink and other extraneous material present. However, these times will vary in the plant, depending on the effectiveness of the apparatus employed.

After completion of the beating action the mass is withdrawn from the beater and the excess liquid is separated from the fiber content which is then washed, if desired, with an organic solvent. The separation and working of the fibers may, for example, be advantageously accomplished by passing the mass from the beater directly to a continuous filter of the Oliver type. In this type of filter a perforated drum rotates in a tank containing the suspension and by the action of reduced pressure or suction the liquid is drawn through the perforations leaving a mat of fiber on the surface of the drum, through which subsequent filtering takes place. During the rotation of the drum the mat of fiber on the surface thereof can be subjected to sprays of organic solvent. Heat as well as reduced pressure can also be used to recover the solvent. Other types of apparatus can also be employed.

If desired, the mat can also be water washed. Whether a water wash is desirable will depend on many factors, for example, the nature of the surfactant employed, whether one wishes to remove water soluble material from the fibers, etc. Alternatively the mat can be reslurried in water and then filtered and rematted on the Oliver filter.

After separation and washing, the fiber is conveyed to a storage chest for use in the manufacture of paper or it is suspended in water and passed over a drum or screen to form laps or sheets of pulp. While the foregoing process results in the production of white pulp, it may be desirable in some instances to subject the recovered fiber to a bleaching operation in which case it is advantageous to pass the fiber from the continuous filter to a chest where the fiber is subjected to the action of a bleaching agent, for example 1% chlorine bleach, after which the bleached fiber is thoroughly washed with water. This washing may also be advantageously conducted by the use of a continuous filter of the Oliver type although other conventional means may be employed.

The process can also be carried out continuously such as by removing the ink from the solvent-surfactant medium, by any suitable means, for example, by filtration, settling and decantation, distillation, etc., and combinations thereof and thereupon reusing the solvent-surfactant medium to deink additional paper. In other words, the solvent-surfactant medium is separated from the paper pulp, freed of ink or other undesirable matter, and reused to treat additional waste paper. The reuse of the solvent-surfactant system can be carried out batchwise or continuously.

Other variations on the above process can also be employed, for example, counter current extraction, etc.

As is quite evident, the efficiency of the present process will vary with the specific solvent-surfactant system as well as the ratios of each employed. For example, a specific class or species of solvent may be more effective as compared with other solvents employing the same surfactant while another solvent may be more effective with one particular class or species of surfactant as compared to other surfactants. In addition, certain surfactants are more effective as deinkers in an organic system which is not followed by a water wash, while others are more effective when followed by a water wash. An advantage of the present invention is the fact that the surfactant can be "custom built" to perform whatever function one desires as to the system employed where no water wash is employed or where a water wash is employed. In addition, the surfactant can be "custom built" for optimum performance in any particular solvent.

As is quite evident, new surfactants will be constantly developed which could be useful in our invention. It is, therefore, not only impossible to attempt a comprehensive catalogue of such compositions, but to attempt to describe the invention in its broader aspects in terms of specific chemical names of its components used would be too voluminous and unnecessary since one skilled in the art could by following the description of the invention herein select a useful surfactant. This invention lies in the use of suitable surfactants in conjunction with suitable organic solvents in deinking paper and their individual compositions are important only in the sense that their properties can affect this function. To precisely define each specific useful surfactant and solvent in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability or specific surfactants and solvents suitable for this invention by applying them in the process set forth herein. In analogy to the case of a machine, wherein the use of certain materials of construction or dimensions of parts would lead to no practical useful result, various materials will be rejected as inapplicable where others would be operative. We can obviously assume that no one will wish to use a useless surfactant or a useless surfactant-solvent system nor will be misled because it is possible to misapply the teachings of the present disclosure to do so. Thus, any surfactant or surfactant-solvent system that can perform the function stated herein can be employed.

The following tests were devised to evaluate the process of the present invention:

Process I

Ten grams of newsprint cut into approximately one inch squares, the solvent and the surfactant were placed in a one pint Mason jar fitted with a Hamilton Beach cutter head and stirred on the Hamilton Beach blender from one to three minutes. The pulp was then filtered, using a 500 ml. filter flask and a Büchner filter funnel, with a wire screen in place of filter paper. The pulp was then washed twice with water by placing the filtered pulp in the blender with 300 ml. of water and stirring for one minute. After each wash, the pulp was then filtered to remove the water. A clean pulp was obtained.

Process II

Ten grams of newsprint cut into approximately one inch squares, the solvent and the surfactant were placed in a one pint Mason jar fitted with a Hamilton Beach cutter head and stirred on the Hamilton Beach blender from one to three minutes. The pulp was then filtered, using a 500 ml. filter flask and a Büchner filter funnel, with a wiere screen in place of filter paper. The pulp was then washed twice with solvent by placing the pulp in the blender with 300 ml. of solvent and stirring for one minute. After each wash, the pulp was then filtered to remove the solvent. A clean pulp was obtained.

It is to be noted that Process I and Process II are carried out in exactly the same manner except for the final wash. Thus, both Processes I and II are in essence non-aqueous processes, differing only in the final step after the completion of the non-aqueous treatment and as much of the solvent as possible is removed for economic reasons.

In Process I a terminal aqueous wash is effected, whereas in Process II a solvent wash is effected. With some surfactants, Process I is preferred, with others Process II is preferred, and with still others Process I or Process II is equally effective.

The following examples were run according to the above procedures and are presented for purposes of illustration and not of limitation.

Although newsprint has been used to illustrate our process, any imprinted cellulosic material can be salvaged for reuse by the process of the present invention, for example various kinds of imprinted paper, such as imprinted newsprint, rotogravure newsprint, bookstock, magazine stock, ledger stock, cardboard, etc. In addition, the process may be used to dewax paper at the same time it deinks, since the solvent-surfactant system also is capable of removing wax during the process.

In addition, it should be realized that the above solvents and surfactants are merely exemplary of a wide variety of other surfactants and solvents which can be employed to yield a clean pulp.

Deinked paper is a very important source of raw material for the manufacture of book and magazine papers, labels, coated papers, etc. Waste ledger papers, bonds, etc., can be deinked making possible the reduction in the amount of virgin pulp required in such grades as patent coated boards, bristols, envelope papers, etc., as well as in book, magazine, and cover papers. Deinked groundwood papers can be used advantageously as subliners in patent-coated, multicylinder boards and as a substantial portion of the liner furnish in manila-lined boards. They are also being used in considerable quantity for the manufacture of hangings, newsprint, poster paper, mimeograph paper, catalog papers, tissues, and similar papers in which groundwood is ordinarily used. Other uses of deinked paper are well known to the art.

Having thus described our invention, what we claim as new and desire to secure by Letters Patent is:

1. A process of deinking imprinted paper products without any prior contact with water consisting essentially of contacting said products with a waterless surfactant-containing organic solvent, said surfactant being substantially soluble in said organic solvent.

2. The process of claim 1 wherein the solvent is a liquid hydrocarbon.

3. The process of claim 2 wherein the surfactant is non-ionic.

TABLE II

| Ex. No. | Solvent | | Surfactant | | | Procedure |
|---|---|---|---|---|---|---|
| | Name | Amt., ml. | Tradename | Chemical name | Amt., ml. | |
| 1 | Kerosine | 270 | | Dinonyl phenoe plus ethylene oxide (weight ratio 1.0 to 1.31) | 30 | I |
| 2 | do | 285 | | do | 15 | I |
| 3 | do | 270 | | do | 30 | I |
| 4 | do | 270 | | Dinonyl pnenol plus ethylene oxide (weight ratio 1.0 to 1.47) | 30 | I |
| 5 | do | 270 | | Dinonyl phenol plus ethylene oxide (weight ratio 1.0 to 1.27) | 30 | I |
| 6 | do | 270 | | Dinonyl phenol plus ethylene oxide (weight ratio 1.0 to 1.75) | 30 | I |
| 7 | do | 270 | | Dinonyl phenol plus ethylene oxide (weight ratio 1.0 to 1.1) | 30 | I |
| 8 | do | 270 | | Dinonyl phenol plus ethylene oxide (weight ratio 1.0 to 1.0) | 30 | I |
| 9 | do | 270 | | Dinonyl phenol plus ethylene oxide (weight ratio 1.0 to .97) | 30 | I |
| 10 | do | 270 | | Dinonyl phenol plus ethylene oxide (weight ratio 1.0 to 2.2) | 30 | I |
| 11 | do | 270 | | Dinonyl phenol plus ethylene oxide (weight ratio 1.0 to 2.4) | 30 | I |
| 12 | do | 270 | Triton X-171 (Rohm & Haas) | Blend of alkyl aryl polyether alcohols with organic sulfonates | 30 | I |
| 13 | do | 275 | Victamul 20 (Victor Chem) | Oxyethylated phosphoric ester | 25 | I |
| 14 | do | 275 | Span-85 (Atlas) | Sorbitan tri oleate | 25 | I |
| 15 | do | 275 | Surfynol TG. (air reduction) | Mixture of ditertiary acetylenic glycol, alkyl phenyl ether of polyethylene glycol and ethylene glycol. | 25 | I |
| 16 | do | 275 | Span-20 (Atlas) | Sorbitan monolaurate | 25 | I |
| 17 | Xylene | 275 | | Dinnoyl phenol (1.0:1.31) plus ethylene oxide | 25 | I |
| 18 | do | 275 | Surfynol 104E (air reduction) | Ethylene glycol solution of a ditertiary acetylenic glycol | 25 | II |
| 19 | do | 275 | Span-85 (Atlas) | Sorbitan trioleate | 25 | II |
| 20 | do | 275 | Span-20 (Atlas) | Sorbitan monolaurate | 25 | II |
| 21 | do | 275 | Victamul 20 (Victor Chem) | Oxyalkylated phosphoric ester | 25 | II |
| 22 | do | 275 | Victamul 89 | Oxyethylated phosphoric ester | 25 | II |
| 23 | do | 275 | Arquad 16 (Armour) | n-Palmityl trimethyl ammonium chloride | 25 | I |
| 24 | do | 275 | Armac C (Armour) | Cocoyl ammonium acetate | 25 | I |
| 25 | do | 275 | Arquad 2-C (Armour) | di-Cocoyl dimethyl ammonium chloride | 25 | I |
| 26 | do | 275 | Amine 220 (Carbide and Carbon) | 1-hydroxyethyl, 2-heptadecenyl glyoxalidine | 25 | I |
| 27 | Turpentine | 275 | | Dinonyl phenol plus EtO (1.0:1.31) | 25 | I |
| 28 | CCl₄ | 275 | | do | 25 | I |
| 29 | Turpentine | 275 | Deriphat 170C (General Mills) | N-lauryl β-amino propionic acid | 25 | I |
| 30 | Xylene | 275 | | Nonyl phenol oxyethylated and sulfated | 25 | I |
| 31 | Turpentine/xylene 50:50 by volume | 270 | Deriphat 170C (General Mills) | n-Lauryl β-amino propionic acid | 30 | I |
| 32 | Cyclohexanone | 270 | | Nonylphenol oxyethylated and sulfated | 30 | I |
| 33 | do | 270 | Deriphat 160C (General Mills) | Partial sodium salt of n-lauryl β-Iminodipropionate | 30 | I |
| 34 | do | 270 | | Dinonyl phenol plus ethylene oxide (1.0:1.31) | 30 | I |

4. The process of claim 2 wherein the surfactant is cationic.

5. The process of claim 2 wherein the surfactant is anionic.

6. The process of claim 2 wherein the surfactant is ampholytic.

7. The process of claim 2 wherein the surfactant is an oxyalkylated phenolic compound.

8. The process of claim 7 wherein the surfactant is an oxyalkylated alkylphenol.

9. The process of claim 2 wherein the surfactant contains an organic sulfonate.

10. The process of claim 2 wherein the surfactant is an oxyalkylated phosphoric ester.

11. The process of claim 2 wherein the surfactant is a sorbitan ester.

12. The process of claim 11 wherein the surfactant is sorbitan trioleate.

13. The process of claim 11 wherein the surfactant is sorbitan monolaurate.

14. A process of deinking imprinted paper products without any prior contact with water consisting essentially of contacting said products with a waterless surfactant-containing low boiling petroleum hydrocarbon solvent, said surfactant being substantially soluble in said solvent.

15. The process of claim 14 wherein the surfactant is an oxyalkylated phenolic compound.

16. The process of claim 15 wherein the surfactant is oxyalkylated alkyl phenol.

17. The process of claim 16 wherein the surfactant is an oxyethylated dinonyl phenol.

18. The process of claim 14 wherein the surfactant is an oxyalkylated phosphoric ester.

19. The process of claim 14 wherein the surfactant is a sorbitan ester.

References Cited in the file of this patent

UNITED STATES PATENTS

| | | |
|---|---|---|
| 1,833,804 | Watanabe | Nov. 24, 1931 |
| 2,390,695 | Dean | Dec. 11, 1945 |

FOREIGN PATENTS

| | | |
|---|---|---|
| 401,145 | Germany | Aug. 28, 1924 |
| 545,113 | Canada | Aug. 20, 1957 |

OTHER REFERENCES

CA41, #1103, 1947, Removal of Synthetic Finishes From Papers To Be Recovered.

CA35, "4205, Regeneration of Pulp From Waste Printed Papers," Japanese Patent 133,421, Nov. 21, 1939.